(12) United States Patent
Chavez et al.

(10) Patent No.: US 10,810,429 B1
(45) Date of Patent: *Oct. 20, 2020

(54) SYSTEMS AND METHODS FOR PROVIDING FINANCIAL INFORMATION VIA AUGMENTED REALITY

(71) Applicant: United Services Automobile Association (USAA), San Antonio, TX (US)

(72) Inventors: Carlos J P Chavez, San Antonio, TX (US); David Jason Anderson James, San Antonio, TX (US); Rachel Elizabeth Csabi, Frisco, TX (US); Quian Jones, San Antonio, TX (US); Andrea Marie Richardson, San Antonio, TX (US); Kre-sante Gordon, San Antonio, TX (US); Michael Robert Pariseau, San Antonio, TX (US); Adrian Borunda, Celina, TX (US); Jeffrey Guarnieri, San Antonio, TX (US); Peter Michael Borges, San Antonio, TX (US); Timothy Noble, II, Lewisville, TX (US); Jason Quon, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,261

(22) Filed: Aug. 31, 2018

Related U.S. Application Data

(60) Provisional application No. 62/552,921, filed on Aug. 31, 2017.

(51) Int. Cl.
*G06K 9/00* (2006.01)
*G06T 11/60* (2006.01)
(Continued)

(52) U.S. Cl.
CPC ......... *G06K 9/00671* (2013.01); *G06Q 40/04* (2013.01); *G06Q 40/06* (2013.01); *G06T 11/60* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2012/0299961 A1* | 11/2012 | Ramkumar | ....... | G06F 16/24575 345/632 |
| 2015/0063661 A1* | 3/2015 | Lee | ........ | G06F 3/011 382/124 |

(Continued)

*Primary Examiner* — Yi Wang
(74) *Attorney, Agent, or Firm* — Fletcher Yoder, P.C.

(57) ABSTRACT

A system may include an image database having a number of images, such that each of the images is linked to a respective organization of a number of organizations. The system may also include a financial database having financial information associated with the number of organizations. The system may also include a processor that receives image data representative of an object, determine an organization associated with the object based on a comparison of the image data with at least one image of the number of images in the image database and a correlation between the at least one image with the organization, and retrieve financial data regarding the organization from the financial database. The processor may then generate visualizations regarding the financial data and overlay the visualizations on the image data.

20 Claims, 8 Drawing Sheets

(51) Int. Cl.
*G06Q 40/06* (2012.01)
*G06Q 40/04* (2012.01)

(56) References Cited

U.S. PATENT DOCUMENTS

2017/0169516 A1* 6/2017 Sohoni .................. G06Q 40/06
2018/0218540 A1* 8/2018 Sridharan .............. H04W 4/02

* cited by examiner

SYSTEMS AND METHODS FOR PROVIDING FINANCIAL INFORMATION VIA AUGMENTED REALITY

CROSS-REFERENCE TO RELATED APPLICATION

This application claims priority to and the benefit of U.S. Provisional Application No. 62/552,921, entitled "SYSTEMS AND METHODS FOR PROVIDING FINANCIAL INFORMATION VIA AUGMENTED REALITY," filed Aug. 31, 2017, which is hereby incorporated by reference in its entirety for all purposes.

BACKGROUND

The present disclosure relates generally to systems and methods for augmenting image data depicted on an electronic display. More specifically, the present disclosure relates to generating financial information via the augmented image data on the electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The use of various electronic devices (e.g., smart phones) has enabled users to have access to information in a variety of locations at any given time. As the proliferation of electronic devices throughout society increases, electronic device designers find new ways to enable consumers to interact with their respective devices. As consumers increasingly use electronic devices to gather information, it is now recognized that the improving the user experience to enable consumers to have easier ways to interact with their electronic devices is desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include an image database that has a plurality of images. Each of the plurality of images may correspond to a respective organization. The system may also include a financial database comprising financial information associated with a plurality of organizations and a processor. The processor may receive image data that includes an object. The processor may then determine an organization associated with object based on the image data and the image database, retrieve financial data regarding the organization from the financial database, generate one or more visualizations that include the financial data, and overlay the image data the one or more visualizations depicted on a display.

In another embodiment, a method may include receiving, via a processor, image data representative of an object acquired via one or more image sensors, comparing the image data with at least one image of a number of images associated with a number of organizations, and correlating the image data with an organization associated with the object based on a correspondence between the image data and the at least one image. The method may also include retrieving financial data regarding the organization from an online resource, generating one or more visualizations having the financial data, and overlaying the one or more visualizations on the image data depicted on a display.

In yet another embodiment, a non-transitory computer-readable medium may include computer-executable instructions that cause a processor to receive image data representative of an object acquired via one or more image sensors, receive account data representative of a status of a financial account associated with a user, and determine an organization associated with the object based on a comparison of the image data with at least one image of a plurality of images in an image database and a correlation between the at least one image with the organization. The processor may then retrieve financial data regarding the organization from the financial database, determine one or more actions based on the organization, the account data, and the financial data, generate one or more visualizations comprising the one or more actions, and overlay the one or more visualizations on the image data depicted on a display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
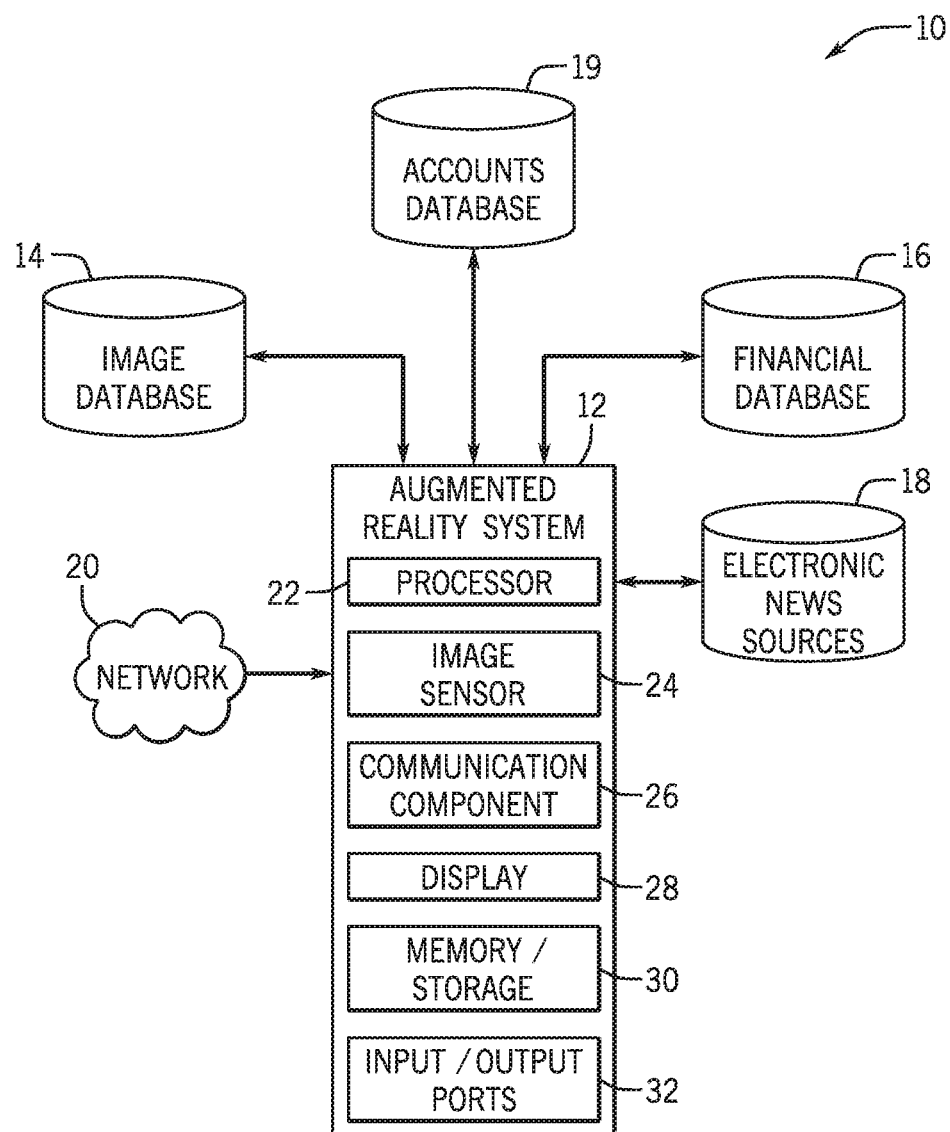
FIG. 1 illustrates a block diagram of a system that includes an augmented reality system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The use of various electronic devices (e.g., smart phones) has enabled users to acquire information regarding the surrounding environment with relative ease. That is, the electronic devices may communicate with various databases to acquire information or data regarding a certain object and display the information via an electronic display for the user to view. In present embodiments, image data acquired by image sensors of the electronic device may be modified to include data regarding the object being captured by the image data. The resulting image or augmented image data may be useful in presenting data regarding the object while also presenting the object in view of the user.

It is now recognized that, as consumers use or encounter certain products while shopping, vacationing, visiting friends, or the like, consumers may wish to learn more about the product or the manufacturer of the product. In accordance with present embodiments, the consumer may acquire image data (e.g., picture, video) of a product using a smart phone device, and the smart phone device may retrieve financial information regarding the product via certain external sources (e.g., Internet). In other embodiments, different devices may be used. After retrieving the financial information, the smart phone device may present the financial data on the image data that includes the product. In this way, the consumer may learn more about products, the manufacturer of a product, the financial status of the manufacturer, and the like with relative ease. This increased availability and ease in acquiring financial information regarding various products may help consumers to learn more about various financial products (e.g., stocks, mutual funds) that may be of interest to the user.

Keeping this in mind, to perform some of the operations described above, a computing system (e.g., smart phone) may receive image data via image sensors, such that the image data may include an image of an object (e.g., product offered for sale). The computing system may query an image database based on the acquired image data to identify product data that corresponds to the object. The product data may include information (e.g., type of product, industry, manufacturer) regarding the object. After identifying the product data, the computing system may query a financial database to determine or retrieve financial data (e.g., stock price) associated with the product data. The computing system may then generate a visualization that includes the financial data and overlay the visualization on the image data received via the image sensors. That is, the computing system may modify the image data being acquired by the image sensors in real time to include the visualizations regarding the financial data. As used herein, data acquired in real time may include data acquired within milliseconds or substantially soon after being acquired by the image sensors, such that the data appears to have been acquired instantaneously or near instantaneously.

In some embodiments, the computing system may receive a user input via a visualization depicted on the electronic display of the computing system. The user input may cause the computing system to execute or open an application or program to enable the user to perform certain actions (e.g., purchase stock, schedule an appointment with a financial advisor, add to notes, add to watch list) related to the financial data associated with the object. Additional details regarding systems and methods for modifying image data depicted by a computing device to include one or more visualizations concerning financial information of an object will be described below.

By way of introduction, FIG. 1 is a block diagram of a system 10 that includes an augmented reality system 12, an image database 14, a financial database 16, electronic news sources 18, an accounts database 19, a network 20, and the like. Although the augmented reality system 12 is illustrated as being coupled to two databases in FIG. 1, it should be noted that the augmented reality system 12 may be communicatively coupled to a variety of data sources that may assist the augmented reality system 12 in performing the embodiments described herein. The augmented reality system 12 may include any suitable computer device, such as a general-purpose personal computer, a laptop computer, a tablet computer, a mobile computer, a smart phone device, and the like that is configured in accordance with present embodiments. The augmented reality system 12 may include various types of components that may assist the augmented reality system 12 in performing various types of computer tasks and operations. For example, the augmented reality system 12 may include a processor 22, one or more image sensors 24, a communication component 26, a display 28, memory/storage 30, an input/output (I/O) port 32, and the like.

The processor 22 may be any type of computer processor or microprocessor capable of executing computer-executable code. The processor 22 may also include multiple processors that may perform the operations described below. The image sensor 24 may be a sensor capable of acquiring image data surrounding the augmented reality system 12. As such, the image sensor 24 may be a camera or other suitable image capturing device (e.g., scanner).

The communication component 26 may be a wireless or wired communication component that may facilitate communication between the augmented reality system 12, databases, and various other computing systems via a network, the Internet, or the like. The display 28 may depict image data acquired by the image sensor 24 and visualizations associated with software or executable code being processed by the processor 22. In one embodiment, the display 28 may be a touch display capable of receiving inputs from a user of the augmented reality system 12. The display 28 may be any suitable type of display, such as a liquid crystal display (LCD), plasma display, or an organic light emitting diode (OLED) display, for example. Additionally, in one embodiment, the display 28 may be provided in conjunction with a touch-sensitive mechanism (e.g., a touch screen) that may function as part of a control interface for the augmented reality system 12.

The memory and the storage 30 may be any suitable articles of manufacture that can serve as media to store processor-executable code, data, or the like. These articles of manufacture may represent computer-readable media (e.g., any suitable form of memory or storage) that may store the processor-executable code used by the processor 22 to perform the presently disclosed techniques. As used herein, applications may include any suitable computer software or program that may be installed onto the augmented reality system 12 and executed by the processor 22. The memory and the storage 30 may represent non-transitory computer-readable media (e.g., any suitable form of memory or storage) that may store the processor-executable code used by the processor 22 to perform various techniques described herein. It should be noted that non-transitory merely indicates that the media is tangible and not a signal. The I/O ports 32 may be interfaces that may couple to other peripheral components such as input devices (e.g., keyboard, mouse), sensors, input/output (I/O) modules, and the like. It should be noted that the components described above with regard to the augmented reality system 12 are exemplary components and the augmented reality system 12 may include additional or fewer components than shown.

In certain embodiments, the augmented reality system 12 may be communicatively coupled to the image database 14, the financial database 16, and the accounts database via the communication component 26. The image database 14 may include a collection of images regarding various objects, products, and the like. The images may have been acquired by scraping the Internet or other image content for various images and information related to the images. For example, the images may include images depicted in product websites, images acquired by individuals and stored on social media, images presented in advertisements, and the like. In one embodiment, the image database 14 may also include data (e.g., metadata) regarding various images. The data may include details regarding the image or the object depicted in the image. The data may include a product name, a product type, a product manufacturer, an industry associated with the product, a link to a particular organization, and the like.

The financial database 16 may include financial or investment data associated with different organizations, manufacturers, or the like. As such, the financial database 16 may include investment information such as stock prices, industry trends, associated stock index, mutual funds, ticker symbols, competitor data, and the like. Generally, the augmented reality system 12 may determine a manufacturer or organization that is associated with an object depicted in image data via the image database 14 and retrieve financial information regarding the manufacturer or organization via the financial database 16. In one embodiment, this determination of the manufacturer or organization is performed by comparing the object depicted in the image data with a number of other similar shaped objects present in images stored in the image database 14 and retrieving the manufacturer or organization information associated with the images that include the similar shaped objects. That is, the images in the image database 14 may include metadata that may store information related to the manufacturer or organization associated with the object in the respective image data.

In certain embodiments, the object depicted in the image may be outlined to form a shape. The formed shape may be compared to shapes stored in the image database 14. By way of example, the outlined shape may be scaled to a certain size (e.g., length, width) and overlaid on the shapes stored in the image database 14 until a match or substantially matching shape is identified. In other embodiments, one or more pixels of the acquired image may be compared to respective pixels of images stored on the image database 14 until a substantially matching group of pixels have been identified.

The accounts database 19 may include account information related to a number of accounts within one or more financial institutions. A user of the augmented reality system 12, for example, may have account data stored in the accounts database 19. The account data may include one or more balances for one or more accounts associated with a respective user, a credit limit for the respective user, a debt-to-asset ratio for the respective user, a risk profile for the respective user, and the like. The risk profile for a user may provide an indication with regard to a level of investment risk or aggressiveness that the corresponding user may have pre-defined to the financial institution. The account data may also include additional information for the user, such as an age, occupation, salary level, income, and other information that may be useful to determine a risk level for a user. In some embodiments, the risk level for a user may be determined based on an amount of income, an amount of savings, an age (e.g., with respect to a desired retirement age), and the like.

In addition to the information listed above for the account data, the account data may also include information regarding investments that are owned by a user. For example, the account data may include a list of stocks, mutual funds, tax-deferring funds, and the like that are owned by the user. In addition, the account data may include a base value or initial value that the user invested in each appropriate investment. In this manner, the account data may be used to determine capital gains or losses for various investments. Other account data for investments may include yield or dividend information for a respective investment and the like. In sum, the accounts database 19 may include a collection of information concerning liquid assets and non-liquid assets for various account holders.

Although the image database 14, the financial database 16, and the accounts database 19 are described as separate databases, it should be noted that, in some embodiments, each of these databases may be implemented by one, two, three, or any suitable number of databases. Moreover, it should be noted that the databases may be accessible via the network 20, a direct communication link, or any suitable communication channel.

Referring now to the augmented reality system 12, a user of the augmented reality system 12 may acquire image or video data of an object by pointing the image sensor 24 to the object located in the viewing presence of the augmented reality system 12. In response, the display 28 may present image data of the object being observed by the image sensor 24. In certain embodiments, the augmented reality system 12 may use the acquired image data to query the image database 14 and retrieve product data regarding the object. After retrieving the product data, the augmented reality system 12 may identify financial information related to the object depicted in the image data based on the product data. The augmented reality system 12 may query the financial database 16 to retrieve financial information related to the object and generate one or more visualizations to overlay the depicted image data of the display 28. The visualizations may include the financial data and, in some embodiments, interactive options that may allow a user to access additional information or perform additional actions with regard to the object.

For example, based on information in the financial database 16, the augmented reality system 12 may determine one or more financial products (e.g., stocks, mutual funds) that may be relevant to the object present in the image data. The augmented reality system 12 may then generate visualizations that represent the financial products to overlay on the image data being depicted on the display 28. As such, the user may be provided relevant financial information related to investment vehicles that correspond to the object currently being viewed in the presence of the augmented reality system 12. This real-time retrieval and presentation of financial data and financial products may provide useful information to the user when considering investment options.

In addition to presenting current financial data, the augmented reality system 12 may query the accounts database 19 and provide capital gain or loss information for investments vehicles that are identified in the image data and owned by the respective user. For instance, after receiving image data that includes a depiction of a product manufactured by a company, the augmented reality system 12 may determine whether the user owns an investment vehicle (e.g., stock, mutual fund) that corresponds to the identified company based on the account data stored in the accounts database 19. If the accounts data indicates that the user owns a corresponding investment vehicle, the augmented reality system 12 may determine a baseline or initial investment that the user provided for the investment vehicle based on the account data. The augmented reality system 12 may then generate a visualization indicative of the capital gain or loss associated with the investment vehicle based on the current financial data and the baseline investment. The visualization may be added to the image data being presented via the display 28.

In addition to the image database 14, the financial database 16, and the accounts database 19, the augmented reality system 12 may be communicatively coupled to other data sources. For example, the augmented reality system 12 may be communicatively coupled to the electronic news sources 18, which may include data regarding various manufacturers and organizations that may be published via news outlets. In addition, the augmented reality system 12 may be coupled to the network 20, which may include the Internet or other suitable networks that may be queried for information regarding various products, objects, manufacturers, organizations, and the like.

Figure 2:
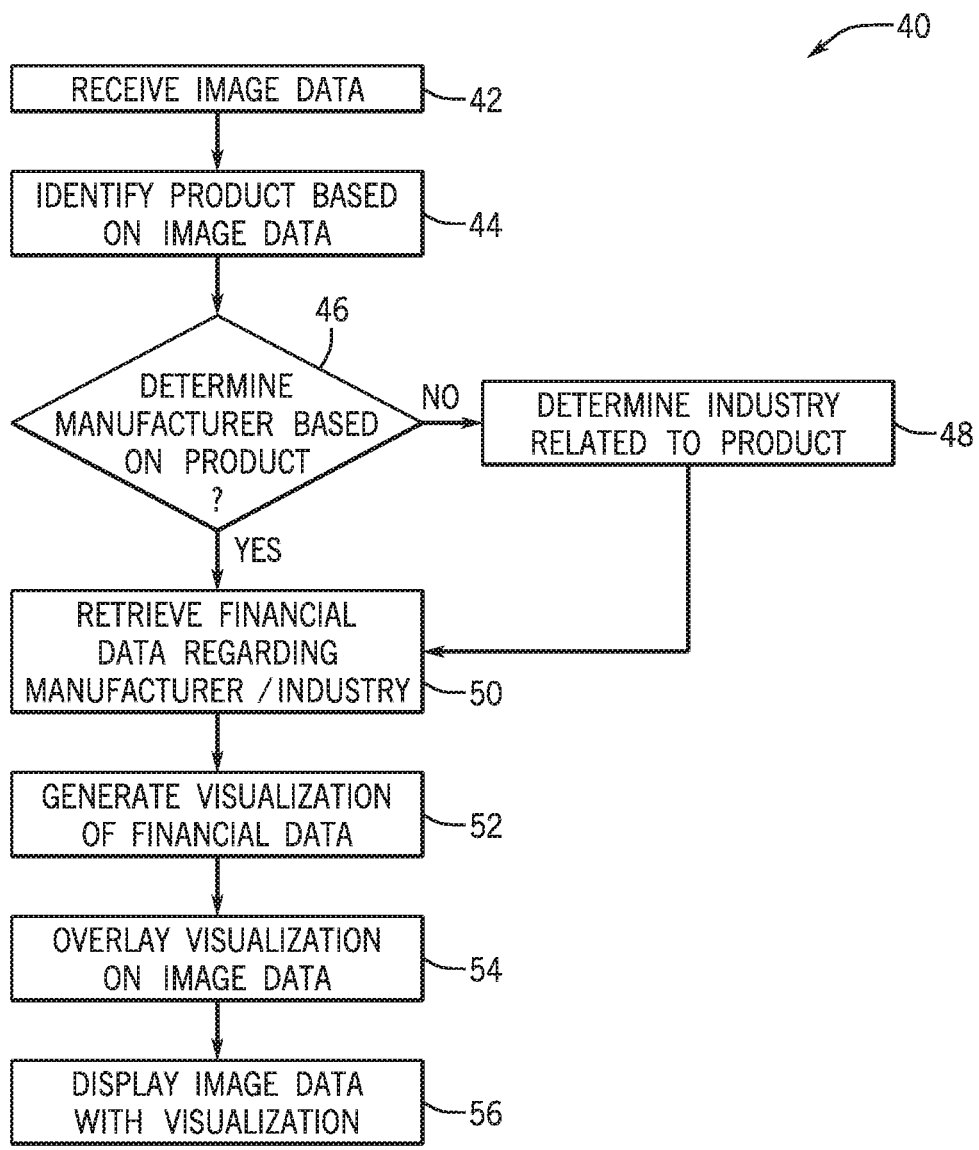
FIG. 2 illustrates a flow chart of a method for displaying financial data using augmented reality on the augmented reality system of FIG. 1, in accordance with embodiments described herein.

Keeping the foregoing in mind, FIG. 2 illustrates an example method 40 that may be employed by the processor 22 of the augmented reality system 12 to present financial data associated with an object present in image data. Although the following description of the method 40 is described as being performed by the processor 22, it should be noted that any suitable processor or processing device may perform the method 40. Moreover, although the method 40 is described in a particular order, it should be understood that the method 40 may be performed in any suitable order.

Referring now to FIG. 2, at block 42, the processor 22 may receive image data associated with an object. As such, in one embodiment, the processor 22 may receive image data being acquired by the image sensor 24 in real time. Alternatively, the processor 22 may receive image data of an image acquired at an earlier time.

At block 44, the processor 22 may identify product data that represents the object present in the image data. In one embodiment, the processor 22 may query or search the image database 14 for product data that matches the image of the object in the image data. That is, the processor 22 may compare the object depicted in the image data to objects depicted in images stored in the image database 14. The images stored in the image database 14 may include metadata or other data that identifies a corresponding product, manufacturer, organization, or the like. In certain embodiments, the processor 22 may use image recognition technology (e.g., face recognition technology) or the like to recognize a shape of the product, a logo for the product, a brand name of the product, or other identifiable information concerning the product within the image. The processor 22 may cross reference the identifiable information with the images in the image database 14, identify a matching image, and determine the product data associated with the image. The product data may include a product name, manufacturer, associated organization, and other relevant information that may identify the object. In some embodiments, the image database 14 may be managed by a server system that operates to receive the image data from the processor 22 and determine the relevant product data for the object depicted in the image data based on the data stored in the image database 14. In this case, the server system may return the product data to the processor 22.

After identifying the product data, the processor 22 may attempt to determine a manufacturer or organization that manufactures the object based on the product data. If the processor 22 is not capable of identifying the manufacturer using the product data, the processor 22 may proceed to block 48 and determine an industry or related products associated with the object present in the image data. For example, the processor 22 may compare the object to images of other objects in the image database 14. Based on the comparison, the processor 22 may identify objects that have the same shape, silhouette, design, name, emblem, symbol, related text (e.g., ingredients or category) and the like. These identified objects may belong to a certain category or classification of products, which may correspond to a particular industry. Based on this analysis, at block 48, the processor 22 may determine an industry or product categorization associated with the object of the image data.

In some embodiments, the processor 22 may store the image data received at block 42 in the image database 14 to update the images of the image database 14. In this way, image database 14 may include additional image data that may be used to identify products and/or organizations. To limit the number of images stored on the image database, the processor 22 may send the image data to the image database 14 in response to a confidence value related to the acquired image data matching one or more images in the image database 14 being greater than some threshold.

After determining the industry, the processor 22 may proceed to block 50 and retrieve financial information regarding the industry. As such, in one embodiment, the processor 22 may query the financial database 16 for financial information regarding the industry. The financial information may include industry trend data, industry profit and loss margins, average stock price of organizations in the industry, stock trend of organizations in the industry, and the like.

Referring briefly back to block 46, if the processor 22 is able to determine the manufacturer of the object based on the product data, the processor 22 may proceed to block 50 and retrieve financial information regarding the manufacturer. It should be noted that the manufacturer may include an organization that physically manufacturers the product, a parent company that owns the rights to the product, or any other suitable organization in which financial data may be available. After retrieving the financial information regarding the manufacturer, the industry, or both, the processor 22 may proceed to block 52.

At block 52, the processor 22 may generate a visualization that includes the financial information. The visualization may include text data, such as a stock price, a ticker symbol, or the like. In addition, the visualization may include graphical data, such as charts, line graphs, bar graphs, and the like that may depict trends with regard to the financial data over time (e.g., day, week, months, years). The visualization may include a transparent background, such that it may be overlaid (e.g., block 54) on the image data received at block 42.

When overlaying the visualization on the image data, the processor 22 may identify a portion of the image data that does not include the object. The processor 22 may then position the visualization on the image data to minimize obstruction of the object. In some embodiments, the processor 22 may scale the image data down to overlay the visualization on the image data. The visualization may include an arrow or indicator that points to the product to clearly indicate to the user that the visualization is related to a particular product in the image. In any case, after the visualization is overlaid on the image data, at block 56, the processor 22 may display the image data with the visualization via the display 28.

It should be noted that, in some embodiments, the image data displayed at block 56 via the display 28 may be in real time. That is, the visualization may be depicted on the display 28 while the image sensor 24 is concurrently acquiring the image data. In this way, the user may move the augmented reality system 12 across different objects and view financial data regarding the objects in real time.

In certain embodiments, the visualizations may be interactive or may receive inputs (e.g., touch input) from a user via the display 28. After receiving an input at the visualization, the processor 22 may open or execute an application that communicatively connects the processor 22 to a network location (e.g., website) that includes additional information related to the specific data depicted in the visualization and that corresponds to the input. For example, if the visualization included a stock quote and the processor 22 received an input at the portion of the visualization that included the stock quote, the processor 22 may open a browser application and access a website that provided additional information related to the stock quote price related to the manufacturer of the object in the image data.

In addition, the visualization may include investment offers related to the object, such as a link to a financial institution that enables the user to purchase stocks, mutual funds, or other investment vehicles related to the object or manufacturer. That is, the input may enable the user to purchase a stock of the manufacturer or mutual fund having the manufacturer listed in its index. The input may also enable the user to sell the stock or mutual fund.

Additionally, the visualization may include an option to schedule an appointment with an investment advisor to discuss the object or financial data related to the object. In one embodiment, after receiving an input via the visualization associated with scheduling an appointment, the processor 22 may execute a calendar application or website, present dates and times that an investment advisor is available, and receive an input to schedule a meeting at a particular date and time. The processor 22 may then update a calendar or schedule associated with the user of the augmented reality system 12 to include the meeting.

Figure 3:
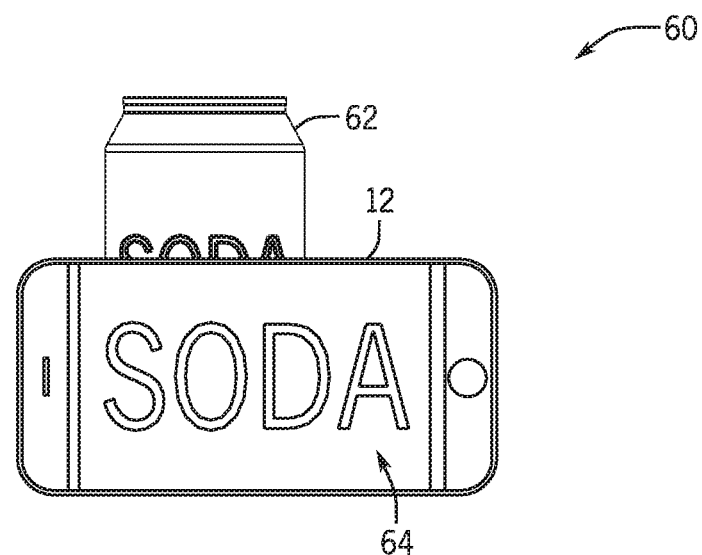
FIG. 3 illustrates an example image data acquired via an image sensor of the augmented reality system in FIG. 1, in accordance with embodiments described herein.

With the foregoing in mind, FIG. 3 illustrates an example view in which the augmented reality system 12 disposed adjacent to an object 62 may generate a visualization 64 of the object 62. In the provided example, the object 62 may correspond to a soda bottle that is labeled "SODA." The augmented reality system 12 may be positioned in front of the object 62 (e.g., see block 42) to receive image data of the object 62 via the image sensor 24 or the like. The initial visualization 64 may include a view of the object 62 based on an angle and distance between the object 62 and the augmented reality system 12.

Figure 4:
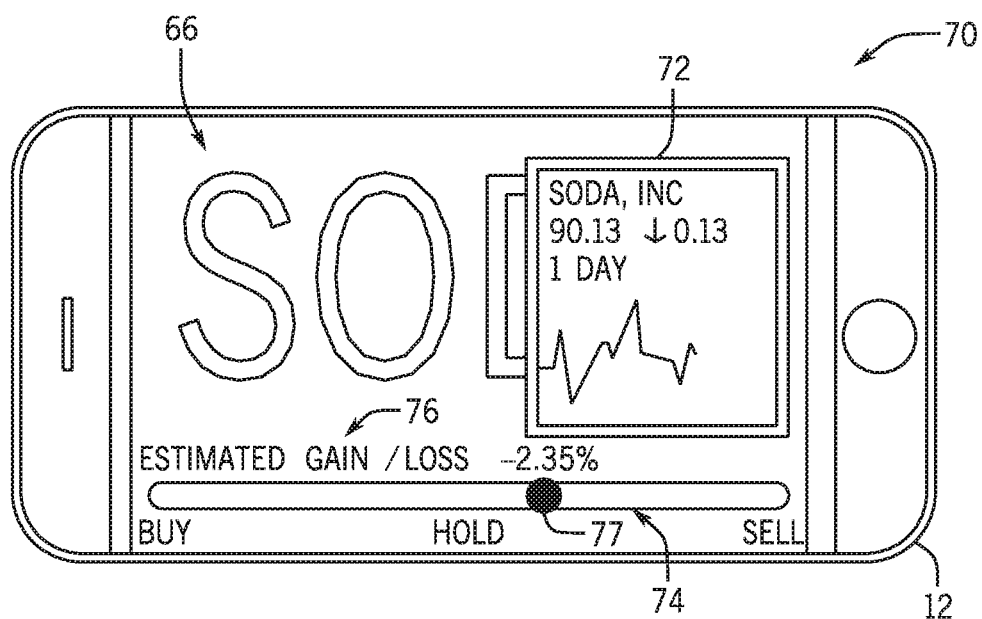
FIG. 4 illustrates an example visualization overlaid on the image data presented in FIG. 3, in accordance with embodiments described herein.

After retrieving the financial data and generating a visualization including the financial data, as described above in blocks 50 and 52 of FIG. 2, the processor 22 may generate the visualization 66 depicted in the example view of FIG. 4. As shown in FIG. 4, the visualization 66 may include a financial data window 72 that depicts at least a portion of the financial data described above with respect to block 50 of FIG. 2. Specifically, the financial data window 72 may include a company name (e.g., Soda, Inc.), a stock price, a change in stock price, and a chart indicative of the stock price over a period of time (e.g., day, week, month). In some embodiments, each item depicted in the financial data window 72 may be linked to additional information concerning the same. For example, the processor 22 may receive an input from a user at the "1 DAY" indication within the financial data window 72, and, in response, the processor 22 may connect a browser application or other application to a website or server that provides additional information or graphs regarding the one-day trading value for the respective stock.

In some embodiments, the processor 22 may also include a recommendation bar 74 in the visualization 66. The recommendation bar 74 may provide an indication related to whether the processor 22 or other suitable system may recommend buying or selling the investment vehicle related to the depicted product. In some embodiments, the processor 22 may make the recommendation based on data available via the accounts database 19, such as a risk profile, an investment suitability, an account balance, and the like. For example, the risk profile or investment suitability for a user may indicate that the user prefers stocks that are expected to be volatile (e.g., price changes more than a threshold daily) with a higher potential return of investment, as compared to other stocks. In addition, the accounts database 19 may include information regarding an account balance for the user, a designated amount of the account balance for investment, an expenditure budget for the user, current investments (e.g., stocks, bonds, mutual funds) owned by the user, and the like. Using the available information, the processor 22 may determine a recommendation to buy or sell the investment vehicle, as shown in the recommendation bar 74. In one embodiment, upon receiving an input at the buy or sell indicators of the recommendation bar 74, the processor 22 may execute an application or direct a browser application to a software tool or site that enables the user to perform the requested transaction.

In addition, if the user of the augmented reality system 12 already owns the investment vehicle associated with the depicted product, the processor 22 may use the account data of the accounts database 19 to determine a capital gain or loss value for the investment vehicle. For instance, the account data may indicate a baseline price for the respective investment vehicle, an amount of initial investment (e.g., shares) for the respective investment vehicle, and the like. The processor 22 may then use this information to determine a total capital gain or loss based on the current price of the investment vehicle. Alternatively, the processor 22 may determine a percent yield or loss of the investment vehicle. An indication 76 of the capital gain/loss is presented on visualization 66.

Figure 5:
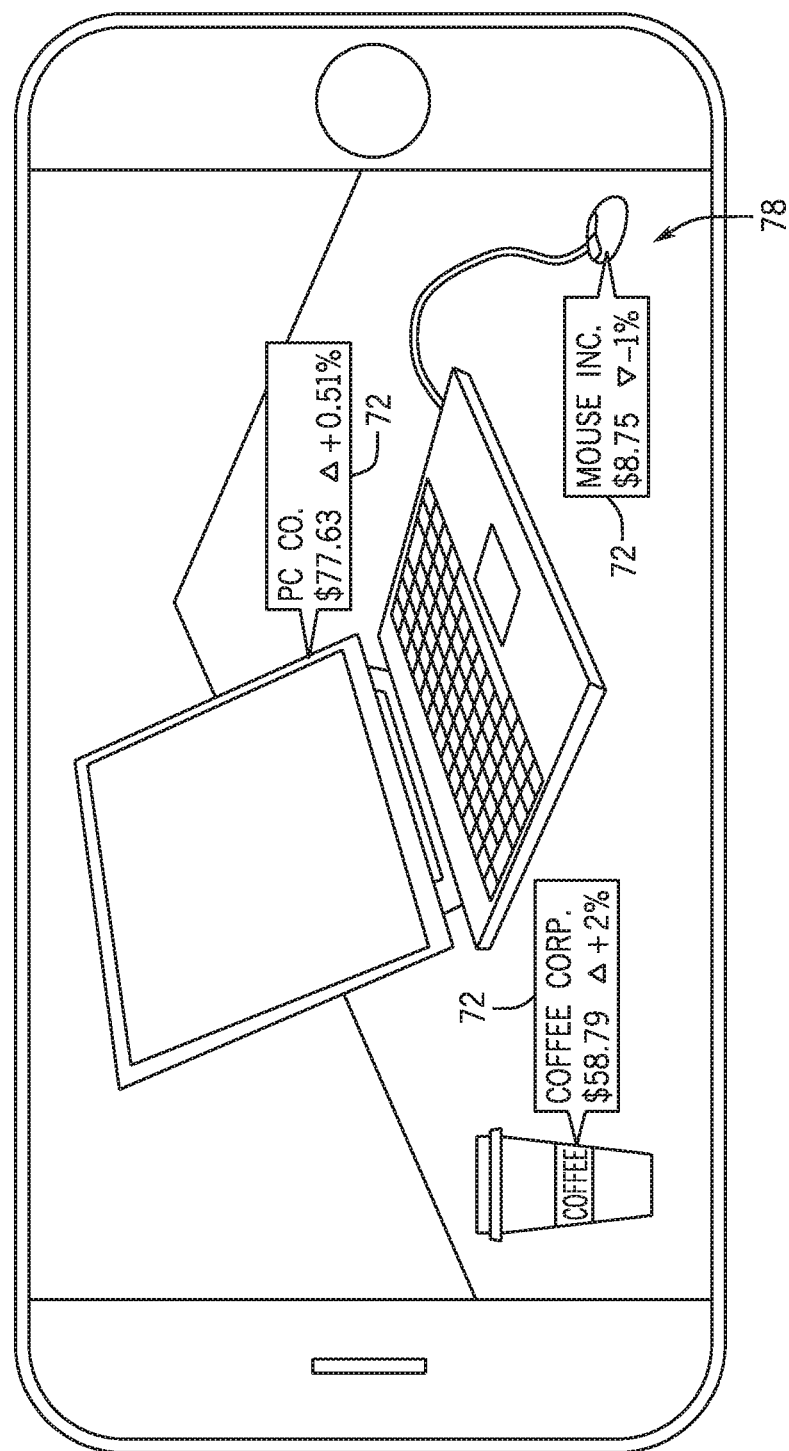
FIG. 5 illustrates another example visualization overlaid on various products presented in image data, in accordance with embodiments described herein.

With the foregoing in mind, it should be noted that the above-described processes are not limited to identifying one product for the received image data. Indeed, a number of products may be identified. In addition to products, it should be understood that service companies may also be identified via the image data based on a recognized trade name, service name, logo, emblem, or other identifying mark. By way of example, FIG. 5 illustrates image data 78 in which the processor 22 may identify three products and generate three financial data windows 72 for the corresponding products.

Figure 6:
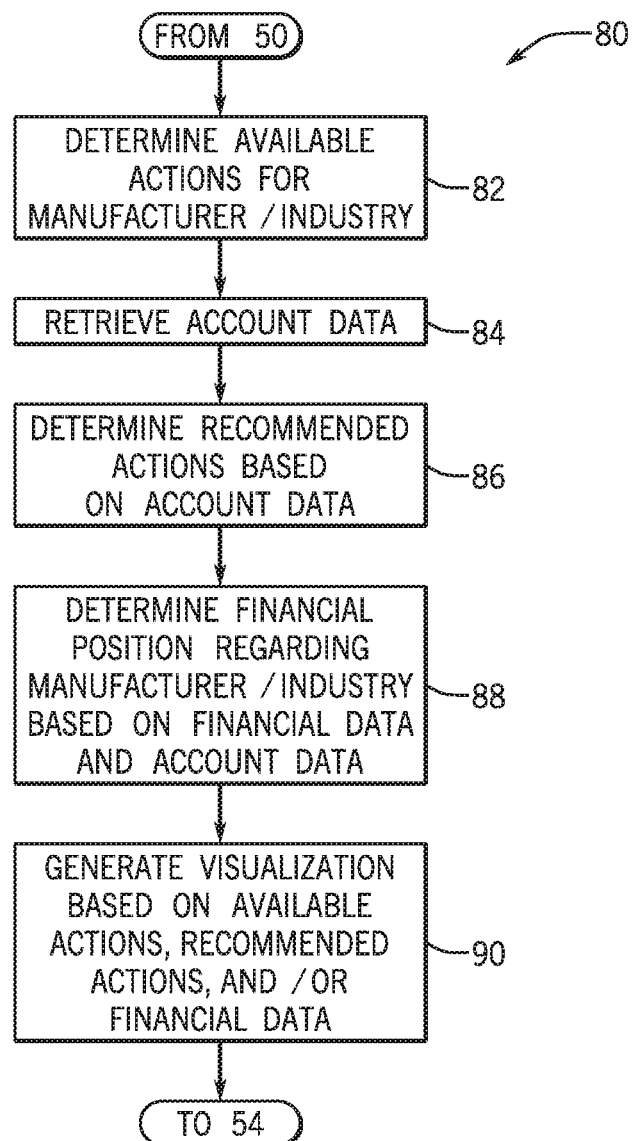
FIG. 6 illustrates a flow chart of a method for displaying available or recommended actions for investments using augmented reality on the augmented reality system of FIG. 1, in accordance with embodiments described herein.

As discussed above, the visualization 66 may include interactive options, icons, or inputs that receive requests to perform certain actions. FIG. 6 illustrates a method 80 for generating the visualization 66 to include these actions. As described above with reference to the method 40, the method 80 may be performed by the processor 22 of the augmented reality system 12 or by any other suitable processing device. In addition, although the method 80 is described in a particular order, it should be understood that the method 80 may be performed in any suitable order.

Referring now to FIG. 6, the method 80 may include performing blocks 42, 44, 46, 48, and 50 of the method 40. As such, after the financial data is determined at block 50, at block 82, the processor 22 may determine available actions for the identified manufacturer or industry. The available actions may include purchasing stock of the manufacturer/industry, purchasing a mutual fund that includes the manufacturer/industry, and the like.

At block 84, the processor 22 may receive account data from the accounts database 19 described above. Based on the account data and the available actions, at block 86, the processor 22 may determine recommended actions for the identified investment vehicles related to the identified products. That is, the processor 22 may first use the account data to determine whether the user owns an investment vehicle associated with the identified product. Based on whether the user owns the investment vehicle, the processor 22 may determine whether the user may desire to purchase shares (e.g., additional or initial shares) in the respective investment vehicle, sell shares of the investment vehicle, or the like. In some embodiments, the account data may provide an indication of investment suitability for the user, in which the user may specify a desired risk level, a desired selling price, a desired purchase price, and the like. Using the account data, the financial data, and the available actions, the processor 22 may determine one or more recommended actions for the user. That is, the processor 22 may compare the current financial status of the investment vehicle, as indicated by the financial data, to certain investment parameters (e.g., risk level, sell threshold, purchase threshold), as indicated in the account data. Based on a relationship between the current financial status of the investment vehicle and the investment parameters, the processor 22 may determine certain recommended actions for the user.

At block 88, the processor 22 may determine a financial position of the user for the investment vehicle identified in the image data. The financial position may be determined based on the account data in the accounts database 19 and may represent a current investment amount in the respective investment vehicle. In one embodiment, the financial position may include a total number of shares of the investment vehicle owned by the user, a total value in a mutual fund represented by the investment vehicle, a capital gain associated with the investment vehicle, a capital loss associated with the investment vehicle, and the like.

In some embodiments, the financial position may be related to an industry or technology area associated with the identified product. For example, a soda can may be represented by the soft drink industry. As such, the processor 22 may determine a percentage or amount of investment vehicles owned by the user in the respective industry of the identified product.

At block 90, the processor 22 may generate a visualization based on the available actions determined at block 82, the recommended actions and/or the financial position determined at block 88. For instance, as shown in FIG. 4, the recommendation bar 74 may include available actions, such as buy or sell shares. The recommendation bar 74 may also present a recommended action by using indicator 77 to recommend that the user should sell the investment vehicle based on the position of indicator 77 on the recommendation bar 74. That is, as the position of the indicator 77 moves closer to the sell end of the recommendation bar 74, the processor 22 provides an increased a degree of indication in which the processor 22 recommends selling the respective investment vehicle. In the same manner, the recommended action may include holding the investment vehicle or buying the investment vehicle based on the position of the indicator 77.

The financial position, as determined at block 88, may also be presented in the visualization 66 via the indicator 76 as discussed above. In some embodiments, the indicator 76 may display a percentage increase or decrease in value based on the base value of the initial investment in the respective investment vehicle. In other embodiments, the indicator 76 may include a total value of the investment, a percentage of a total investment in the respective investment vehicle, or the like.

After generating the visualization at block 90, the processor 22 may return to block 54 of the method 40. As such, the processor 22 may overlay the visualization generated at block 90 on the image data presented via the display 28. In some embodiments, each of the individual items presented in the generated visualizations may receive an input (e.g., touch) to cause the processor 22 to provide additional data regarding the respective portion of the visualization, direct the user to another application for performing an action, and the like.

In addition to generating visualizations, the augmented reality system 12 may be employed to provide notifications or alerts regarding investment vehicles that may be of interest to a user based on image data acquired by the image sensors 24 or received by the processor 22. That is, a user of the augmented reality system 12 may specify certain investment vehicles (e.g., stocks, industries) that may be of interest to the user. These investment vehicles may be stored in the account data of the accounts database 19 or any other suitable storage. For example, the user may specify a list of investment vehicles as part of a watchlist.

In addition to a list of the investment vehicles, the user may specify investment parameters or conditions in which the user desires to be notified concerning a respective investment vehicle. For example, the user may indicate a target price for a particular investment vehicle that the user may wish to be notified or alerted. Using the augmented reality system 12 described above, the processor 22 may identify products and associated investment vehicles in image data, determine financial data for the investment vehicles, determine whether the financial data corresponds to the investment parameters, and generate notifications for the user when the financial data corresponds to the investment parameters. The notifications may include an audible notification or a visual notification, such as a highlight or color effect applied to the respective product depicted in the image data. In any case, the augmented reality system 12 may assist the user to remember to purchase, sell, or perform some other action on a particular investment vehicle based on image data received by the processor 22. In this way, the user may have a more innovative experience in deciding whether to buy or sell an investment vehicle when viewing image data via the display 28 of the augmented reality system 12 or other suitable electronic device.

Figure 7:
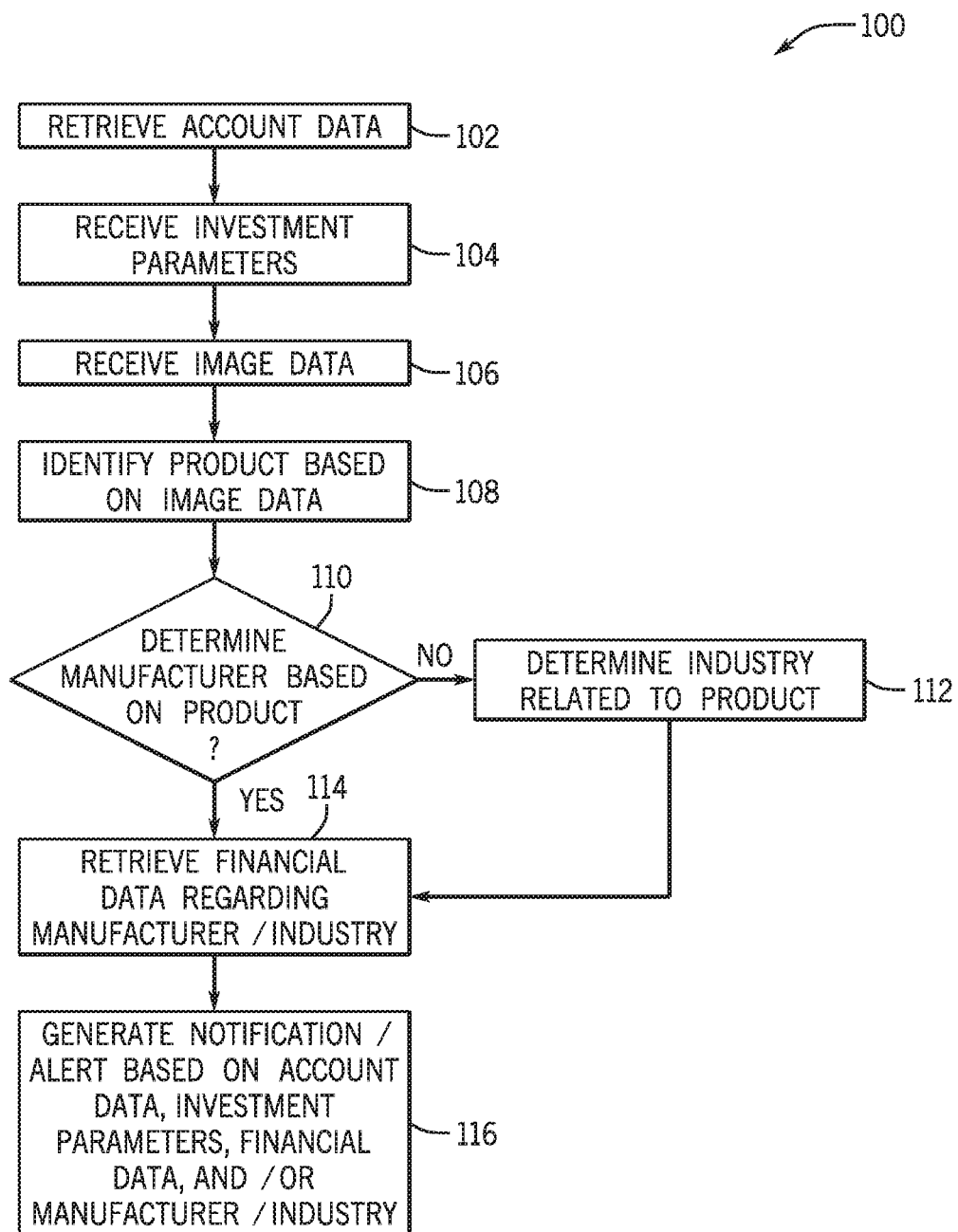
FIG. 7 illustrates a flow chart of a method for generating alerts using the augmented reality on the augmented reality system of FIG. 1, in accordance with embodiments described herein.

Keeping this in mind, FIG. 7 illustrates a method 100 for generating the notifications or alerts related to an investment vehicle based on products identified in image data. As described above with reference to the method 40, the method 100 may be performed by the processor 22 of the augmented reality system 12 or by any other suitable processing device. In addition, although the method 100 is described in a particular order, it should be understood that the method 100 may be performed in any suitable order.

Referring now to FIG. 7, at block 102, the processor 22 may receive account data as described above. The account data may include an account balance, a list of assets (e.g., stocks, bonds, mutual funds), and the like. At block 104, the processor 22 may receive investment parameters related to desired investments for the user of the augmented reality system 12. The investment parameters may provide an indication of desired industries or technologies that may be of interest to the user. In addition, the investment parameters may include desired prices or trading values for certain investment vehicles. For example, the investment parameters may indicate that the user desires to be aware when a particular investment vehicle (e.g., stock) has reached a 52-week low price. In addition, the investment parameters may specify a desired purchase price or sale price for one or more investment vehicles, industries or technologies represented by the investment vehicles, and the like. In some embodiments, the investment parameters may be stored with the account data received at block 102, but it should be noted that the investment parameters may also be received via user input and stored in other suitable storage components.

At block 106, the processor 22 may receive image data from the image sensor 24 or via the memory/storage component 30. The image data may include images that are acquired and presented via the display 28 in real time or images that were acquired at an earlier time. Based on the image data, at block 108, the processor 22 may identify one or more products present in the image data. That is, as described above with reference to block 44 of FIG. 2, the processor 22 may use image recognition technology to scan the image data for identifying features of objects present in the image data. As discussed above, the processor 22 may recognize a logo, an icon, or other identification material that may be disposed on a product presented in the image data.

At blocks 110 and 112, the processor 22 may determine a manufacturer or industry associated with the identified product as detailed above with respect to blocks 46 and 48. After determining the manufacturer or industry associated with the product, the processor 22 may, at block 114, retrieve financial data regarding the identified manufacturer and/or industry. The financial data may correspond to the investment parameters received at block 104. That is, the financial data may include information that are related to the investment parameters that are of interest to the user.

Based on the account data, the investment parameters, and/or the financial data, at block 116, the processor 22 may generate an alert or notification for the user. In one embodiment, if the financial data corresponds to a condition specified in the investment parameters, the processor 22 may generate a notification indicative of the condition being met. The conditions may include a certain price point for an investment vehicle being present, an investment vehicle identified via the image data being on a user-defined watchlist, an industry trend (e.g., market capitalization) for a product identified in the image data meeting specified threshold, an available amount of funds being present in a user account, and the like.

By way of example, the notification may include generating a visualization that is overlaid on the respective product presented in the image data. The visualization may provide information related to the notification, such as an indication of a condition being met. In other examples, the notification may include an audible notification that may involve synthesized text output via an audio output (e.g., speaker) of the augmented reality system 12. In this way, the user may be notified of an investment parameter condition being met when viewing image data on the display 18.

In some embodiments, the notification or alert may be generated and may cause the processor 22 to execute an application or exit a low-power mode to help ensure that the user is aware of the alert. Indeed, pricing for certain investment vehicles may change quickly and, as such, the processor 22 may initiate the application or generate an audible or visible alert in response to detecting that the investment parameter conditions are present.

It should be noted that the processor 22, at block 116, may generate the notification or alert based on a variety of conditions being met. For example, the user may specify in the investment parameters to provide a notification when the account data indicates that the user has a certain amount of funds, a price of a respective investment vehicle is above or below some threshold, or the like. As such, the notification may cause the processor 22 to open an application or access a website to initiate a trade to purchase or sell the respective investment vehicle associated with the notification.

In some cases, the investment parameters may specify a weight or percentage of investment in a particular manufacturer, company, industry, or the like with respect to the total investments of the user. As such, in one example, the processor 22 may generate a notification in response to a percentage or value of a total invested amount in a particular technology falling below some threshold due to the price of certain investment vehicles identified in image data decreasing. With this in mind, it should also be noted that the notification may be generated via a visualization that provides personalized information for the user that may detail the percentages of investment in different technologies via a bar graph, pie graph, or some other graphic.

As discussed above, the generated visualization may receive inputs from user that may cause the processor 22 to retrieve additional information regarding the information depicted within the corresponding portion of the visualization. For instance, if the user selects or touches a portion of the visualization that includes a graph that described the historical pricing of an investment vehicle, the processor 22 may access information regarding the pricing of the investment vehicle via the Internet or the like.

In addition to providing financial data, the processor 22 may also generate visualizations that include currency conversion data based on image data that includes certain currency. That is, in some embodiments, the processor 22 may receive image data that includes a number of currency cash (e.g., banknotes, coins, tokens, cash, cryptocurrency), determine a currency exchange rate for the currency cash, and display a visualization that includes an equivalent currency amount for the currency cash in another currency. For example, as users travel to different countries, the augmented reality system 12 may receive location data regarding the location of the augmented reality system 12 and determine local currency based on the location. The processor 22 may then receive image data having notes or currency cash presented therein and determine an equivalent amount of currency in the local currency for the notes presented in the image based on the location of the augmented reality system 12. The processor 22 may present a visualization on the presented image data to convey conversion information, such as the equivalent value, the conversion rate, or the like. Additional details with regard to providing conversion rate information via the display 28 is described below with reference to FIGS. 8-10.

Figure 8:
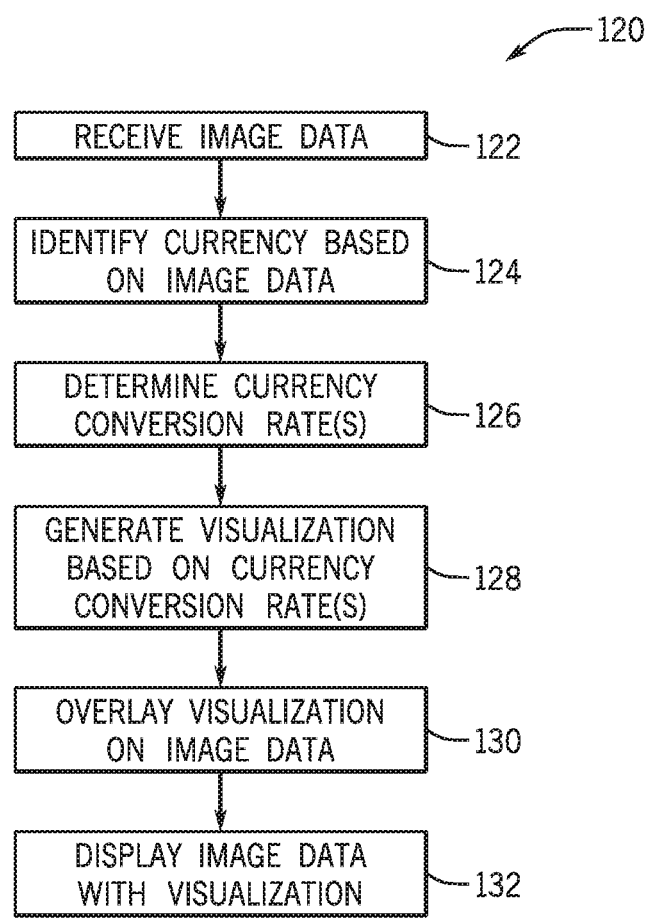
FIG. 8 illustrates a flow chart of a method for displaying currency conversion data using augmented reality on the augmented reality system of FIG. 1, in accordance with embodiments described herein.

With the foregoing in mind, FIG. 8 illustrates a method 120 for generating a visualization that includes currency conversion information based on currency cash depicted in image data. Although the method 120 is described as being performed by the processor 22, it should be noted that any suitable processor or processing device may perform the method 120. Moreover, although the method 120 is described in a particular order, it should be understood that the method 120 may be performed in any suitable order.

Figure 9:
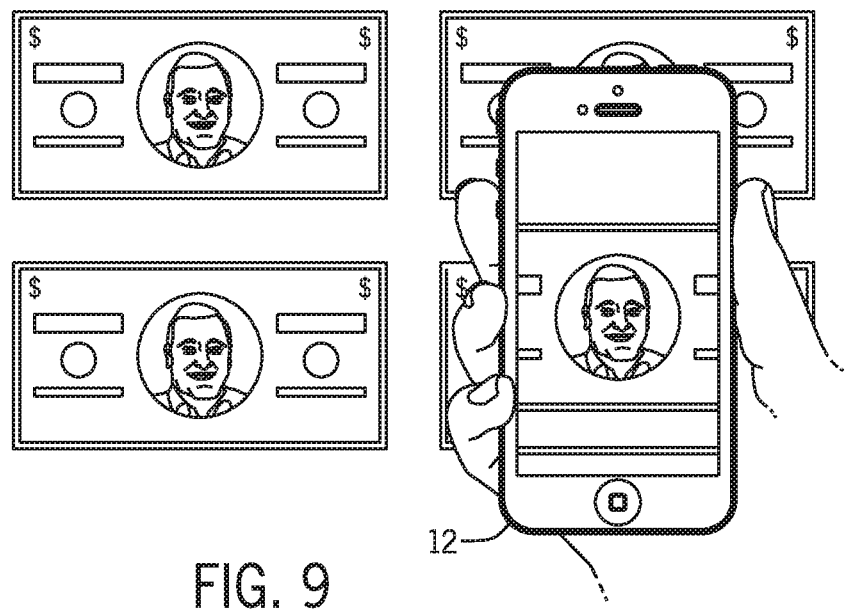
FIG. 9 illustrates an example of image data being acquired via an image sensor of the augmented reality system in FIG. 1 while performing the method of FIG. 8, in accordance with embodiments described herein.

Referring now to FIG. 8, at block 122, the processor 22 may receive image data that includes a number of currency cash via the image sensor 24 or the like. The image data may be acquired in real time or at a previous time. It should be noted that the image data may be received via email or data transmission in addition to via the image sensor 24. By way of example, FIG. 9 illustrates an example view in which the augmented reality system 12 may acquire image data including cash (e.g., currency cash, coins).

After receiving the image data, at block 124, the processor 22 may identify the currency depicted in the image data. For example, in one embodiment, the processor 22 may query the image database 14, which may include a collection of images of difference currency cash around the world. Based on image comparison techniques, the image database 14 may identify a currency or country that matches the currency paper of the image data. The image database 14 may then provide the currency information to the processor 22. In some embodiments, the processor 22 may present a list of countries or receive an input indicative of a country to use for the currency conversion.

At block 126, the processor 22 may determine a currency conversion rate associated with the currency cash based on the identified currency and another currency issuing country or bank. In one embodiment, the processor 22 may receive an input indicative of the currency issuing country or bank to which the currency cash are to be converted. In other embodiments, the processor 22 may determine the location of the augmented reality system 12 (e.g., via the network 20, global positioning sensors, metadata stored with the image data) and determine the currency conversion rate of the currency cash with respect to the currency that corresponds to the country in which the augmented reality system 12 is located or when the image was acquired.

Figure 10:
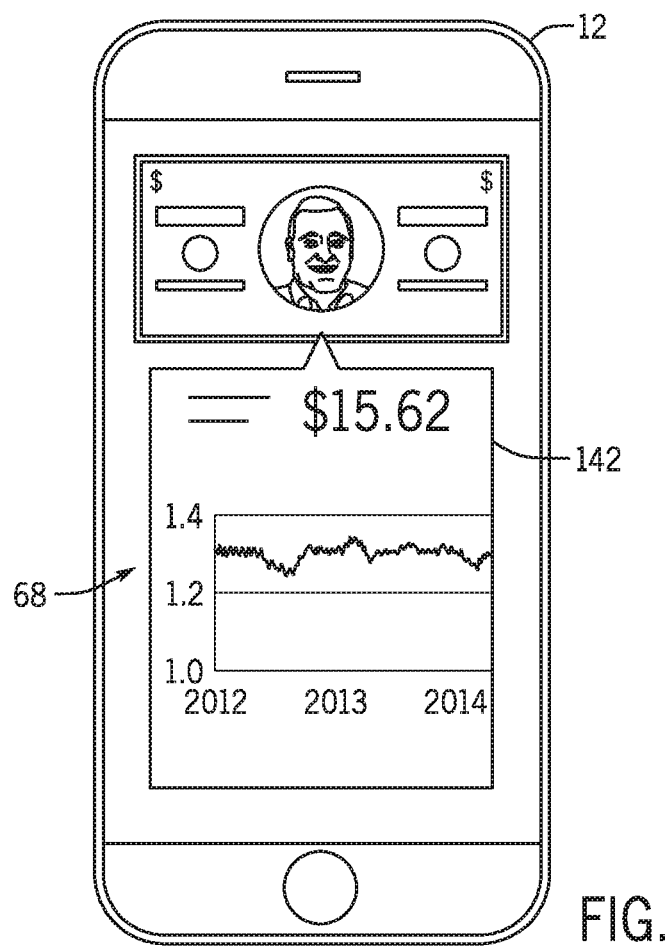
FIG. 10 illustrates an example visualization overlaid on the image data presented in FIG. 9, in accordance with embodiments described herein.

In any case, at block 128, the processor 22 may generate a visualization based on the currency conversion rate and the currency cash depicted in the image data. The visualization may include an equivalent currency amount of the currency cash in the selected currency country or bank. At block 130, the processor 22 may overlay the visualization on the image data received at block 82. The processor 22 may then display the image data with the visualization via the display 28. For example, FIG. 10 illustrates an example view of a visualization 68 that includes the currency cash described above and the currency conversion window 142 that includes currency conversion data, such as the equivalent currency amount, a chart depicting a trend of the currency amount over time, and the like.

In other embodiments, based on the processor 22 may generate visualizations of equivalent currency cash based on the currency cash depicted in the image data, the financial data related to the conversion rate between the currency cash and the selected currency, a collection of images of the equivalent currency cash, or the like. For instance, the processor 22 may receive image data with 5 U.S. dollars and may generate a visualization of equivalent currency cash of the country that the processor 22 is currently located. Alternatively, the processor 22 may receive image data with 5 U.S. dollars and may generate a visualization of equivalent currency cash of the country that the user of the processor 22 resides.

In addition, the processor 22 may also provide visualizations that include information related to news regarding the currency type of the currency cash depicted in the image data. The news may include a trend of the currency value, bond yield rates for the currency, and the like. The news may also include a strength indicator with respect to another currency. In some embodiments, the strength indicator may be made with reference to cryptocurrency.

To better convey the value of currency cash depicted in the image data, the processor 22 may provide a visualization of products that may be purchased for the depicted currency cash. For example, for a certain amount of currency cash depicted in the image data, the processor 22 may present a number of gallons of milk that may be purchased in the country where the user of the processor 22 may reside. In this way, the user may better ascertain the value of each unit of the currency cash.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
    an image database comprising a plurality of images, wherein each of the plurality of images is linked to an organization of a plurality of organizations;
    a financial database comprising financial information associated with the plurality of organizations;
    a processor configured to:

receive image data representative of an object on an electronic display, wherein the image data is acquired via one or more image sensors;

receive account data representative of a status of a financial account associated with a user;

determine the organization associated with manufacturing the object based on a logo or a brand name depicted on the object in the image data, a comparison of the image data with at least one image of the plurality of images in the image database, and a correlation between the at least one image with the organization;

retrieve financial data regarding the organization from the financial database;

determine one or more actions based on the organization, the account data, and the financial data, wherein the one or more actions comprise buying or selling an investment vehicle associated with the organization;

generate one or more visualizations comprising the financial data and one or more input visualizations configured to receive one or more inputs for implementing the one or more actions;

overlay the one or more visualizations on the image data depicted on an electronic display; and display the one or more visualizations overlaid on the image data via the electronic display.

2. The system of claim 1, wherein the one or more input visualizations are configured to receive the one or more inputs via the display.

3. The system of claim 1, wherein the financial data comprises a stock quote, a trend associated with the stock quote, a ticker symbol associated with the organization, or any combination thereof.

4. The system of claim 1, wherein the image data is depicted on the display in real time.

5. The system of claim 1, wherein the one or more visualizations are depicted adjacent to the object in the image data.

6. The system of claim 1, wherein the one or more input visualizations are configured to cause the processor to perform the one or more actions.

7. The system of claim 6, wherein the one or more actions comprise opening a browser application.

8. A method, comprising:
receiving, via a processor, image data representative of an object, wherein the image data is acquired via one or more image sensors;

receiving, via the processor, account data representative of a status of a financial account associated with a user;

displaying, via the processor, the image data via an electronic display;

comparing, via the processor, the image data with at least one image of a plurality of images, wherein the plurality of images is associated with a plurality of organizations;

correlating, via the processor, the image data with an organization of the plurality of organizations, wherein the organization is associated with manufacturing the object based on a logo or a brand name depicted on the object in the image data and a correspondence between the image data and at least the at least one image;

retrieving, via the processor, financial data regarding the organization from an online resource;

determining, via the processor, one or more actions based on the organization, the account data, and the financial data, wherein the one or more actions comprise buying or selling an investment vehicle associated with the organization;

generating, via the processor, one or more visualizations comprising the financial data and one or more input visualizations configured to receive one or more inputs for implementing the one or more actions;

overlaying, via the processor, the one or more visualizations on the image data depicted on an electronic display; and displaying, via the processor, the one or more visualizations overlaid on the image data via the electronic display.

9. The method of claim 8, wherein comparing the image data with at least one image of the plurality of images comprises identifying a product name, a manufacturer, or both.

10. The method of claim 9, wherein the product name, the manufacturer, or both is identified using image recognition technology.

11. The method of claim 8, comprising determining, via the processor, an industry associated with the organization and generating one or more additional visualizations having include additional financial data associated with the industry, wherein the one or more additional visualizations are overlaid on the image data.

12. The method of claim 11, wherein the additional financial data comprises industry trend data, industry profit and loss margin data, an average stock price of one or more organizations in the industry, a stock trend of organizations in the industry, or any combination thereof.

13. The method of claim 8, wherein comparing the image data with at least one image of the plurality of images comprises comparing a shape of the object with at least one shape of at least one object represented in the at least one image.

14. The method of claim 8, wherein the one or more visualizations comprise a chart, a line graph, a bar graph, or any combination thereof.

15. A non-transitory computer-readable medium comprising computer-executable instructions, that when executed, are configured to cause a processor to:
receive image data representative of an object, wherein the image data is acquired via one or more image sensors;

display the image data via an electronic display;

receive account data representative of a status of a financial account associated with a user;

determine an organization associated with manufacturing the object based on a logo or a brand name depicted on the object in the image data, a comparison of the image data with at least one image of a plurality of images in an image database and a correlation between the at least one image with the organization;

retrieve financial data regarding the organization from a financial database;

determine one or more actions based on the organization, the account data, and the financial data, wherein the one or more actions comprise buying or selling an investment vehicle associated with the organization;

generate one or more visualizations comprising the financial data and one or more input visualizations configured to receive one or more inputs for implementing the one or more actions;

overlay the one or more visualizations on the image data depicted on a display; and display the one or more visualizations overlaid on the image data via the electronic display.

16. The non-transitory computer-readable medium of claim 15, wherein the investment vehicle comprises a stock or a mutual fund.

17. The non-transitory computer-readable medium of claim 15, wherein the computer-executable instructions, when executed, are configured to cause the processor to:
determine financial position data of the user with respect to the organization based on the financial data and the account data; and
modify the one or more visualizations to include the financial position data.

18. The non-transitory computer-readable medium of claim 17, wherein the financial position data comprises a capital gain or a capital loss associated with the user and the organization.

19. The non-transitory computer-readable medium of claim 18, wherein the capital gain or the capital loss is represented by a percentage.

20. The non-transitory computer-readable medium of claim 15, wherein determining the one or more actions is based on comparing a present financial status of the investment vehicle with one or more investment parameters of the financial account.

* * * * *